United States Patent
Oh et al.

(10) Patent No.: US 11,872,890 B2
(45) Date of Patent: Jan. 16, 2024

(54) CONTROL METHOD FOR GENERATING VIRTUAL SENSATION OF GEAR SHIFTING OF ELECTRIC VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 600 days.

(21) Appl. No.: 17/115,135

(22) Filed: Dec. 8, 2020

(65) Prior Publication Data

US 2021/0387531 A1 Dec. 16, 2021

(30) Foreign Application Priority Data

Jun. 10, 2020 (KR) .................. 10-2020-0070005

(51) Int. Cl.
*B60L 15/20* (2006.01)

(52) U.S. Cl.
CPC .......... *B60L 15/20* (2013.01); *B60L 2240/12* (2013.01); *B60L 2240/42* (2013.01); *B60L 2240/421* (2013.01); *B60L 2250/16* (2013.01); *B60L 2250/26* (2013.01); *B60L 2260/24* (2013.01); *B60L 2260/26* (2013.01)

(58) Field of Classification Search
None
See application file for complete search history.

(56) References Cited

U.S. PATENT DOCUMENTS

| 2014/0195088 A1* | 7/2014 | Schuessler | B60W 50/14 701/22 |
|---|---|---|---|
| 2021/0229550 A1* | 7/2021 | Isami | B60L 15/2054 |
| 2021/0309113 A1* | 10/2021 | Mazzini | B60L 7/14 |

* cited by examiner

*Primary Examiner* — Todd Melton
*Assistant Examiner* — Jason R Roberson
(74) *Attorney, Agent, or Firm* — Fox Rothschild LLP (57) ABSTRACT

A control method of an electric vehicle is proposed. The control method includes generating and realizing a virtual sensation of gear shifting the same as that of a vehicle equipped with a multi-speed transmission, in the electric vehicle without a multi-speed transmission. In particular, virtual gear shift intervention torque and limit torque for each virtual gear shift stage are determined from input variables through a virtual gear shift model by inputting vehicle driving information collected from a vehicle during operation. Then the determined virtual shift intervention torque, the determined limit torque for each virtual shift stage, and motor torque command are applied to operate a motor, thereby realizing the virtual sensation of multi-speed gear shifting.

19 Claims, 8 Drawing Sheets

FIG. 6 calculation of limit torque for each virtual gear shift stage by reflecting gear ratio information

——— virtual target gear shift ——— virtual engine speed
——— longitudinal acceleration sensor measurements
——— virtual current gear shift ——— actual motor speed
--------- limit torque for each virtual gear shift stage
————— virtual gear shift progress

CONTROL METHOD FOR GENERATING VIRTUAL SENSATION OF GEAR SHIFTING OF ELECTRIC VEHICLE

CROSS REFERENCE TO RELATED APPLICATION

The present application claims priority to Korean Patent Application No. 10-2020-0070005, filed Jun. 10, 2020, the entire contents of which is incorporated herein for all purposes by this reference.

BACKGROUND

Field of the Disclosure

The present disclosure relates to a control method of an electric vehicle and, more particularly, to a control method of an electric vehicle capable of generating and realizing a sensation of gear shifting being the same as that of a vehicle equipped with a multi-speed transmission, in an electric vehicle without a multi-speed transmission.

Description of the Related Art

As is well known, an electric vehicle (EV) is a vehicle that drives using a motor as a source of driving force for driving the vehicle. The powertrain of the electric vehicle includes: a battery that supplies electric power for driving a motor; an inverter connected to the battery to drive and control the motor; a motor connected to the battery to be charged and discharged through the inverter as a driving source of a vehicle; and a reduction gear that decelerates rotational force of the motor and transmits the rotational force to driving wheels.

When driving the motor, the inverter converts direct current (DC) supplied from the battery into alternating current (AC) and applies the alternating current to the motor through a power cable. When regenerating the motor, the inverter converts the alternating current generated by the motor operating as a generator into the direct current to supply to the battery, for the inverter to charge the battery.

In addition, unlike a conventional internal combustion engine vehicle, an ordinary electric vehicle does not use the multi-speed transmission, but the reduction gear using a fixed gear ratio is disposed between the motor and the driving wheel instead. The reason is that the internal combustion engine has a wide distribution range of energy efficiency with respect to operating points and may only provide high torque in a high speed area, whereas, in the case of the motor, the difference in efficiency with respect to the operating points is relatively small, and low-speed, high-torque may be realized only with the motor's individual characteristics.

There is clearly an advantage in that absence of a transmission provides smooth operability without the driving performance interruption due to gear shifting. However, for a driver who desires to have fun in driving, the absence of the transmission and a sensation of gear shifting may give a sense of boredom to the driver. Accordingly, in the electric vehicle without the multi-speed transmission and equipped with the reduction gear, there is required the technology that allows a driver to experience driving sensibility, fun, excitement, and a sense of direct connection, which are provided by a vehicle equipped with the multi-speed transmission.

SUMMARY

Therefore, the present disclosure provides a control method of an electric vehicle capable of generating and realizing a sensation of gear shifting being the same as that of a vehicle equipped with a multi-speed transmission, in an electric vehicle without the multi-speed transmission.

In order to achieve the objective, according to an exemplary embodiment of the present disclosure, a control method of generating a virtual sensation of gear shifting of an electric vehicle may include: determining, by a controller, a basic torque command in real time based on vehicle driving information collected from a vehicle during driving of the electric vehicle; determining, by the controller, a virtual target gear shift stage based on the vehicle driving information collected from the vehicle; determining, by the controller, a gear shift class from a virtual current gear shift stage and the determined virtual target gear shift stage and selecting a virtual gear shift intervention torque profile corresponding to the determined current gear shift class from among preset virtual gear shift intervention torque profiles for each gear shift class; determining, by the controller, a virtual gear shift intervention torque for generating the virtual sensation of gear shifting in the real time according to the selected virtual gear shift intervention torque profile and generating a final motor torque command using the determined basic torque command and the virtual gear shift intervention torque; and adjusting, by the controller, operation of a motor for driving the vehicle according to the generated final motor torque command.

Thus, according to the control method of the electric vehicle of the present disclosure, it is possible to generate and realize the sensation of gear shifting the same as that of a vehicle equipped with the multi-speed transmission, in the electric vehicle without the multi-speed transmission.

BRIEF DESCRIPTION OF THE DRAWINGS

A brief description of each drawing is provided to more sufficiently understand drawings used in the detailed description of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present disclosure will be described in detail with reference to the accompanying drawings so that those skilled in the art may easily implement the present disclosure. However, the present disclosure is not limited to the embodiment described herein and may be embodied in other forms.

The objective of the present disclosure is to provide a control method of an electric vehicle capable of generating and realizing a sensation of multi-speed gear shifting the same as that of a vehicle equipped with a multi-speed transmission, in the electric vehicle without the multi-speed transmission.

In the following description, a motor refers to driving motor that drives a vehicle, and in the present disclosure, the vehicle to be operated may be an electric vehicle equipped with a reduction gear without an internal combustion engine (i.e., general engine) and a multi-speed transmission. As described above, in the case of a pure electric vehicle driven by a motor (i.e., motor-driven vehicle), unlike a conventional internal combustion engine vehicle, the pure electric vehicle does not use a multi-speed transmission, but a reduction gear using a fixed gear ratio is disposed between the motor and driving wheels instead.

However, in the absence of the multi-speed transmission, there is an advantage of smooth operability without interruption of driving performance at the time of gear shifting, but when a driver desires driving sensibility, fun, excitement, a sense of direct connection, and others which are provided by the multi-speed transmission, the driver may feel boredom while driving. Therefore, in the electric vehicle equipped with the reduction gear instead of the multi-speed transmission, there is required the technology that allows a driver to experience driving sensibility, fun, excitement, a sense of direct connection, and others, which are provided by the multi-speed transmission.

As in the present disclosure, when a driver desires to experience driving sensibility, fun, excitement, a sense of direct connection, etc. of which only a transmission may provide, it may be possible to improve and differentiate the vehicle's commercial value when provided a function to implement the virtual sensation of gear shifting to enable the driver to experience the desired sensations and fun in the same vehicle, without having to replace the vehicle. In addition, in a conventional electric vehicle, it is not possible to adjust gear shift stages by a driver, and only a speed and accelerator pedal input maybe used to adjust the vehicle's behavior. However, when a function for the virtual sensation of gear shifting is realized in a vehicle capable of high-performance sport driving, it may be possible to facilitate management of cornering entry speed, load transfer, and others, when driving.

Therefore, there is a need for a method for realizing a virtual multi-speed gear shifting in the electric vehicle without a multi-speed transmission. Accordingly, a control method for a motor is disclosed in which a virtual gear shift model is established and a sensation of multi-speed gear shifting may be realized using the same.

The present disclosure is characterized in that virtual gear shift intervention torque and limit torque for each virtual gear shift stage are determined from input variables through the virtual gear shift model that uses vehicle driving information collected from a vehicle during driving as an input, and then the determined virtual shift intervention torque, the determined limit torque for each virtual shift stage, and motor torque command may be used to control a motor, to realize the virtual multi-speed gear shifting.

In the present disclosure, the virtual gear shift function may refer to generating the virtual sensation of gear shifting according to the driver's driving input values and vehicle conditions based on values of variables (i.e., parameters) related to the generating the virtual sensation of gear shifting preset, to simulate the multi-speed gear shifting that the driver may sense when gear shifting in a vehicle having a multi-speed transmission, while driving an electric vehicle without a multi-speed transmission.

Additionally, the virtual sensation of gear shifting may be a simulation of vehicle behavior and movement that a driver may sense during a gear shift process of the multi-speed transmission, and in the present disclosure, the virtual sensation of gear shifting is generated and realized through control of a driving motor. In particular, the multi-speed transmission may be one of an automatic transmission (AT), a dual clutch transmission (DCT), and an automated manual transmission (AMT). The virtual sensation of gear shifting is provided by generating and simulating vehicle behavior and movement appearing during the gear shift process of a vehicle equipped with one of these transmissions through the operation of the driving motor.

Figure 1:
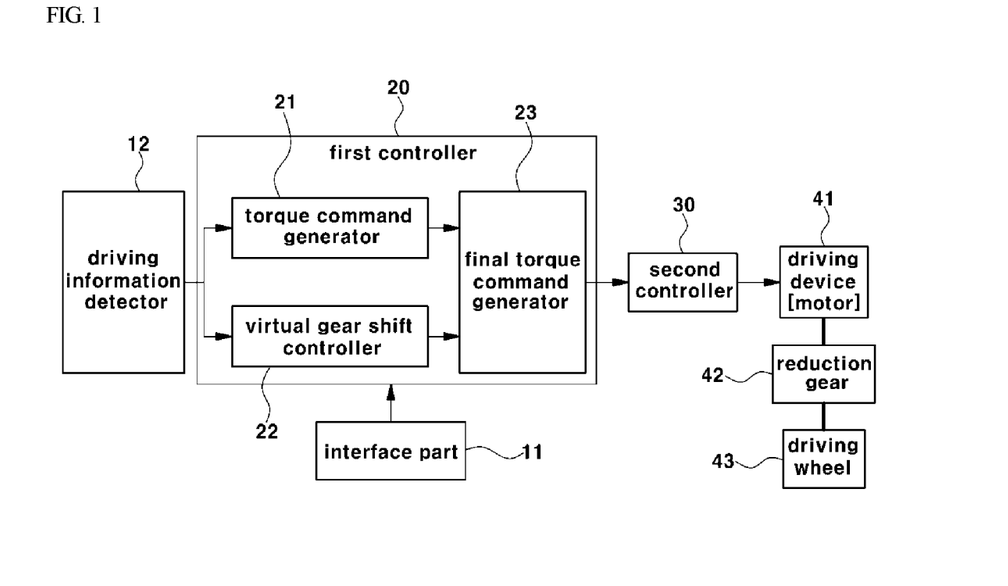
FIG. 1 is a block diagram showing a device configuration for controlling an electric vehicle according to the present disclosure.
Figure 2:
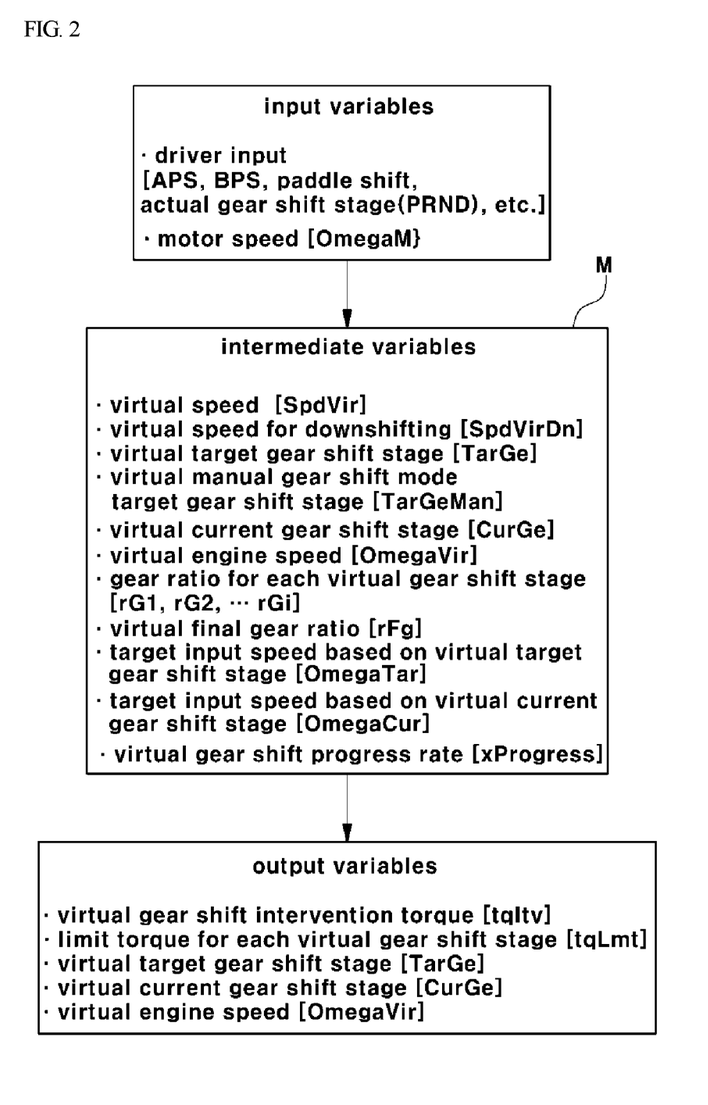
FIG. 2 is a block diagram showing input and output variables, and virtual gear shift intermediate variables of a virtual gear shift model for implementing a virtual gear shift function in the present disclosure.
Figure 3:
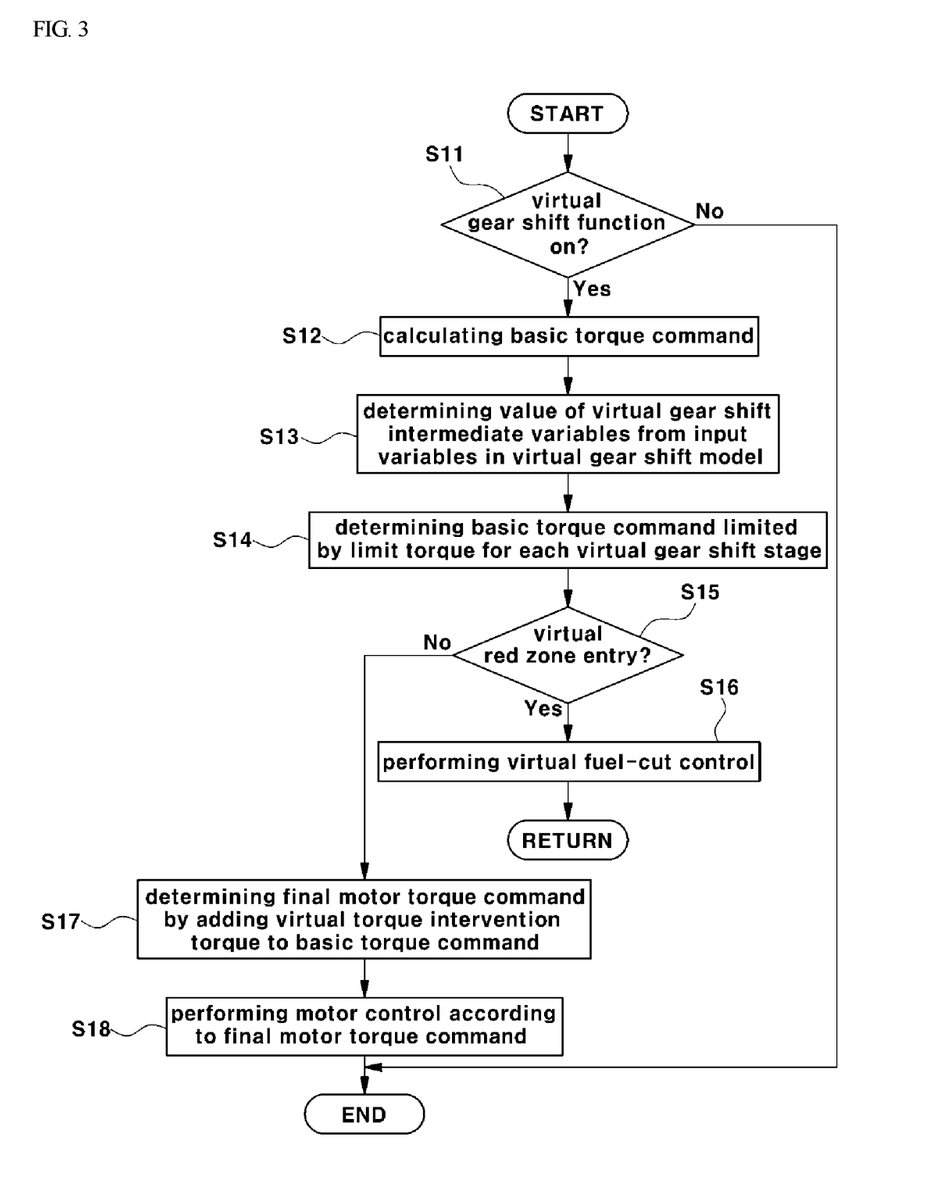
FIG. 3 is a flowchart showing a process for implementing the virtual gear shifting function in the present disclosure.

FIG. 1 is a block diagram showing a device configuration for controlling an electric vehicle according to the present disclosure, and FIG. 2 is a block diagram showing input and output variables, and virtual gear shift intermediate variables of a virtual gear shift model for implementing a virtual gear shift function in the present disclosure. In addition, FIG. 3 is a flowchart showing a process for implementing the virtual gear shift function in the present disclosure. The control method according to the present disclosure may include virtual gear shift method for generating and realizing the virtual sensation of gear shifting that simulates the multi-speed gear shifting of a conventional multi-speed transmission vehicle through control of the motor during vehicle driving.

Referring to FIG. 3, the control method according to the present disclosure may include: step S11, determining whether the virtual gear shift function is on; step S12, calculating a basic torque command in real time when the virtual gear shift function is on; step S13, determining a virtual gear shift intermediate variable value from an input variable in the virtual gear shift model; and step S14, determining the basic torque command limited by limit torque for each virtual gear shift stage (i.e., the limit torque of current gear shift stage).

In addition, the control method according to the present disclosure may further include: step S15, determining whether a virtual red zone has been entered from a virtual engine speed; step S16, performing virtual fuel-cut control when determined that the virtual red zone has been entered; step S17, determining a final motor torque command by adding virtual gear shift intervention torque to the basic torque command; and step S18, performing a motor control according to the final motor torque command.

Describing a device configuration for performing the above-described virtual gear shift process, as shown in FIG. 1, a device for control according to the present disclosure may include: a driving information detector 12 configured to detect vehicle driving information; a first controller 20 configured to generate and output a torque command based on the vehicle driving information detected by the driving information detector 12; and a second controller 30 configured to operate a driving device 41 according to the torque command output from the first controller 20.

In addition, a device for control according to the present disclosure may further include an interface part 11 that a driver uses to selectively input one of on and off of the virtual shift function of the vehicle. In the following description, the controller is divided into the first controller 20 and the second controller 30, but a plurality of controllers or a single integrated control element is collectively referred to as the controller, and it may also be understood that a control process is performed by the controller according to the present disclosure.

As the interface part 11, any device may be used, as long as it is a device for a driver to operate on and off of the virtual gear shift function in a vehicle, and for example, an operating device such as a button and a switch provided in the vehicle and other input device or touch screen of AVN (Audio, Video, Navigation) systems, and others are applicable. The interface part 11 may be connected to the first controller 20, and then, in response to receiving an on or off operation input by the driver, an on operation signal or off operation signal may be input or transmitted to the first controller 20 in the interface part 11 Accordingly, the first controller 20 may be configured to recognize an on or off operation state of the virtual gear shift function by the driver.

In the present disclosure, the virtual gear shift function for generating and realizing the virtual sensation of gear shifting during vehicle driving may be performed only when the driver inputs on of the virtual gear shift function through the interface part 11 (See step S11 in FIG. 3). In addition, when the above-described interface part 11 is a vehicle input device provided in a vehicle, although not shown in FIG. 1, instead of using the vehicle input device, the driver may perform on and off operation of the virtual gear shift function through a mobile device (not shown).

The mobile device must be communicatively connected to an in-vehicle device such as the first controller, and to this end, an input/output communication interface (not shown) for establishing communication between the mobile device and the first controller 20 is utilized. The driving information detector 12 may be configured to detect vehicle driving information necessary to generate a motor torque command in a vehicle, where the vehicle driving information may include driving input information of the driver and vehicle status information.

In an exemplary embodiment of the present disclosure, the driving information detector 12 may include: an accelerator pedal detector configured to detect accelerator pedal input information according to a driver's accelerator pedal operation; and a brake pedal detector configured to detect brake pedal input information according to a driver's brake pedal operation. The driving information detector 12 may further include: a paddle shift and shift lever detector; and a motor speed detector configured to detect a rotational speed (hereinafter referred to as "motor speed") of a motor that is the driving device 41 for driving a vehicle.

Particularly, the accelerator pedal detector may be an ordinary accelerator pedal sensor (i.e., accelerator position sensor, APS) installed on an accelerator pedal and configured to output an electrical signal according to the driver's accelerator pedal operation state. The brake pedal detector may be an ordinary brake pedal sensor (BPS) installed on a brake pedal and configured to output an electrical signal according to a driver's brake pedal operation state. In addition, the motor speed detector may be a known resolver installed in a motor (i.e., driving motor) 41.

At this time, the driver's driving input information may include an accelerator pedal input value (APS value) detected by the accelerator pedal detector and a brake pedal input value (BPS value) detected by the brake pedal detector. In addition, the driver's driving input information may further include: paddle shift input information according to the driver's paddle shift operation; and shift lever input information (i.e., information of P, R, N, and D gears) according to the driver's shift lever operation.

The shift lever input information may be detected by a shift lever detector, and the paddle shift input information may be received by the first controller 20 from the paddle shift. In addition, the vehicle status information may include a motor speed detected by the motor speed detector. The driving information used to generate the basic torque command in a torque command generator 21 may further include a vehicle speed as vehicle status information, and in this case, the driving information detector 12 is not shown in FIG. 1, but a vehicle speed detector configured to detect current driving vehicle speed may be further included, and the vehicle speed detector may be configured to include a wheel speed sensor installed in a driving wheel of a vehicle.

In addition, the first controller 20 may include: a torque command generator 21 configured to generate a basic torque command from vehicle driving information; a virtual gear shift controller 22 configured to generate a correction torque command (i.e., a virtual gear shift intervention torque command for realizing the virtual sensation of gear shifting) for generating and realizing the virtual sensation of gear shifting from the vehicle driving information; and a final torque command generator 23 configured to correct the basic torque command with the correction torque command to generate a corrected final torque command.

The basic torque command may be a motor torque command determined and generated based on driving information collected during driving in an ordinary electric vehicle (step S12), and the torque command generator 21 may be a vehicle controller (VCU) configured to generate the motor torque command based on the driving information in the ordinary electric vehicle, or a part of the vehicle controller. In addition, in the present disclosure, the virtual gear shift controller 22 is a novel component configured to determine, generate, and output a virtual gear shift intervention torque command, which is a correction torque command for realizing only the virtual sensation of gear shifting apart from the basic torque command, and may be added as a part of the vehicle controller therein or may be provided as a separate control component apart from the vehicle controller.

In the final torque command generator 23, the basic torque command input from the torque command generator 21 may be corrected by the correction torque command input from the virtual gear shift controller 22, but the final torque command may be calculated by adding the virtual gear shift intervention torque command which is the correction torque command to the basic torque command. The second controller 30 is a controller configured to receive the torque command, transmitted from the first controller 20, that is, the final torque command determined by the final torque command generator 23 of the first controller 20 to operate the driving device 41.

In the present disclosure, the driving device 41 is a motor (i.e., driving motor) configured to drive a vehicle, and the second controller 30 is a known motor controller (i.e., motor control unit, MCU) configured to operate the motor using an inverter in an ordinary electric vehicle and controls the operation of the motor. Meanwhile, in the present disclosure, the virtual gear shift model for determining and outputting a virtual gear shift intervention torque command using the vehicle driving information collected from a vehicle as an input may beset and input to the virtual gear shift controller 22.

The input variable of the virtual gear shift model becomes the vehicle driving information detected by the driving information detector 12, and the vehicle driving information may include driving input information of a driver and vehicle status information as described above. Particularly, the driver's driving input information may include accelerator pedal input information (i.e., information of APS value), brake pedal input information (i.e., information of BPS value), paddle shift input information, and shift lever input information (i.e., information of P, R, N, and D gears). In addition, the vehicle status information may include the motor speed.

In the virtual gear shift controller 22, values of intermediate variables may be calculated from a model input variable by the virtual gear shift model, and further, from the values of these intermediate variables, a torque command for generating and realizing the virtual sensation of gear shifting, and a limit torque for each virtual gear shift stage reflecting gear ratio information may be determined and output (See step S13). In particular, the torque command for generating and realizing the virtual sensation of gear shifting becomes not only the virtual gear shift intervention torque command but also the correction torque command for correcting the basic torque command.

Referring to FIG. 2, as vehicle driving information, the input variable of the virtual gear shift model M may include: accelerator pedal input information (information of APS value); brake pedal input information (information of BPS value); paddle shift input information; shift lever input information (information of P, R, N, and D gears); and motor speed Omega information. In addition, in FIG. 2, intermediate variables used to perform a virtual gear shift function in the virtual gear shift model M, that is, model intermediate variables for generating the virtual sensation of gear shifting obtained from input variables in the virtual gear shift model are illustrated.

In the exemplary embodiment of the present disclosure, the intermediate variable obtained from the input variable may include virtual speed SpdVir, a virtual speed for down-shifting SpdVirDn, a virtual target gear shift stage TarGe, a virtual manual gear shift mode target gear shift stage TarGe-Man, a virtual current gear shift stage CurGe, a virtual engine speed OmegaVir, a gear ratio for each virtual gear shift stage rG1, rG2, . . . , and rGi, a virtual final gear ratio rFg, a target input speed based on virtual target gear shift stage OmegaTar, a target input speed based on virtual current gear shift stage OmegaCur, and a virtual gear shift progress rate xProgress.

When it is assumed that a virtual transmission and a virtual engine exist in a vehicle, the "input speed" refers to the virtual engine speed that becomes the input speed of the virtual transmission. Accordingly, the "target input speed based on virtual target gear shift stage" refers to the virtual engine speed of virtual target gear shift stage, and the "target input speed based on virtual current gear shift stage" refers to the virtual engine speed of virtual current gear shift stage.

In the present disclosure, the intermediate variable for virtual gear shift is not related to a physical value of a real hardware of a vehicle, and is used only to realize the virtual sensation of gear shifting. In addition, the physical variables used as actual measurements or interventions in the powertrain of the electric vehicle may be referred to the above input variables (APS value, BPS value, paddle shift input value, and shift lever input value), the motor speed Omega, the virtual gear shift intervention torque tqltv, and the limit torque for each virtual gear shift stage tqLmt.

In the exemplary embodiment of the present disclosure, the output variable of the virtual gear shift model M may include a virtual gear shift intervention torque command (i.e., correction torque command) tqltv for providing and realizing the virtual sensation of gear shifting. In addition, the output variable of the virtual gear shift model M may further include limit torque for each virtual gear shift stage tqLmt.

Further, in the exemplary embodiment of the present disclosure, the output variables of the virtual gear shift model M may include at least some of the virtual gear shift intermediate variables, and for example, the virtual target gear shift stage TarGe, the virtual current gear shift stage CurGe, and the virtual engine speed OmegaVir among the virtual gear shift intermediate variables may be further included.

The virtual target gear shift stage TarGe, the virtual current gear shift stage CurGe, and the virtual engine speed OmegaVir, which are output from the virtual gear shift model M, may be transmitted to a cluster controller (not shown) and may become cluster display information displayed on a cluster (not shown). The virtual gear shift intervention torque command and the limit torque for each virtual gear shift stage (which is the limit torque of current gear shift stage) output from the virtual gear shift controller 22 are input to the final torque command generator 23, and then, the final torque command generator 23 may be used to generate the final torque command from the basic torque command.

In other words, in the final torque command generator 23 when necessary, the basic torque command may be limited to the limit torque for each virtual gear shift stage (step S14), wherein, when the basic torque command is less than the limit torque, the basic torque command may be used as it is, whereas, when the basic torque command is greater than the limit torque, the basic torque command may be limited to the limit torque value. Accordingly, the basic torque command limited to the value within the limit torque for each virtual gear shift stage in the final torque command generator 23 may then be summed with the virtual gear shift intervention torque command, and the summed torque command becomes the final motor torque command (step S17).

When the basic torque command is greater than or equal to the limit torque, the final motor torque command may be determined by the sum of the limit torque value and the virtual gear shift intervention torque command. In this regard, the final motor torque command calculated in the final torque command generator 23 may be transmitted to the second controller 30, and the second controller 30 may be configured to operate the motor according to the final motor torque command, in step S18.

Hereinafter, the virtual gear shift intermediate variables in the virtual gear shift model M in the virtual gear shift controller 22 will be described in more detail. First, in the virtual gear shift model M of the virtual gear shift controller 22, the virtual vehicle speed SpdVir may be generated as an input of a gear shift schedule map, and this virtual vehicle speed SpdVir may be used as a reference vehicle speed in the virtual gear shift function. The virtual vehicle speed SpdVir may be calculated as a value directly proportional to the actual motor speed Omega using the actual motor speed Omega and the virtual final gear ratio rFg, which are some of the model input variables.

In the example of FIG. 2, the virtual final gear ratio is shown as included in the virtual gear shift intermediate variable, but in the exemplary embodiment of the present disclosure, the virtual final gear ratio rFg may be a predetermined value. In addition, in the virtual gear shift model, a virtual vehicle speed for downshifting SpdVirDn is generated, and this is a variable used as an input of a gear shift schedule map during downshift, thereby being calculated by applying a preset scale factor and an offset value to the virtual vehicle speed SpdVir.

However, when the gear shift schedule maps for upshifting and downshifting are separately provided and used, there is no problem to use only the virtual vehicle speed SpdVir that is the reference speed. When using a single gear shift schedule map without distinction between upshifting and downshifting, a virtual vehicle speed for downshift SpdVirDn may be further used in addition to the virtual vehicle speed SpdVir that is the reference vehicle speed to add a hysteresis effect between upshift and downshift. To realize a common hysteresis effect in the present disclosure, after the virtual vehicle speed SpdVir is multiplied by a scale factor greater than 1, the virtual vehicle speed for downshift SpdVirDn may be determined as a value obtained by adding a positive offset value to the above multiplied value.

Figure 4:
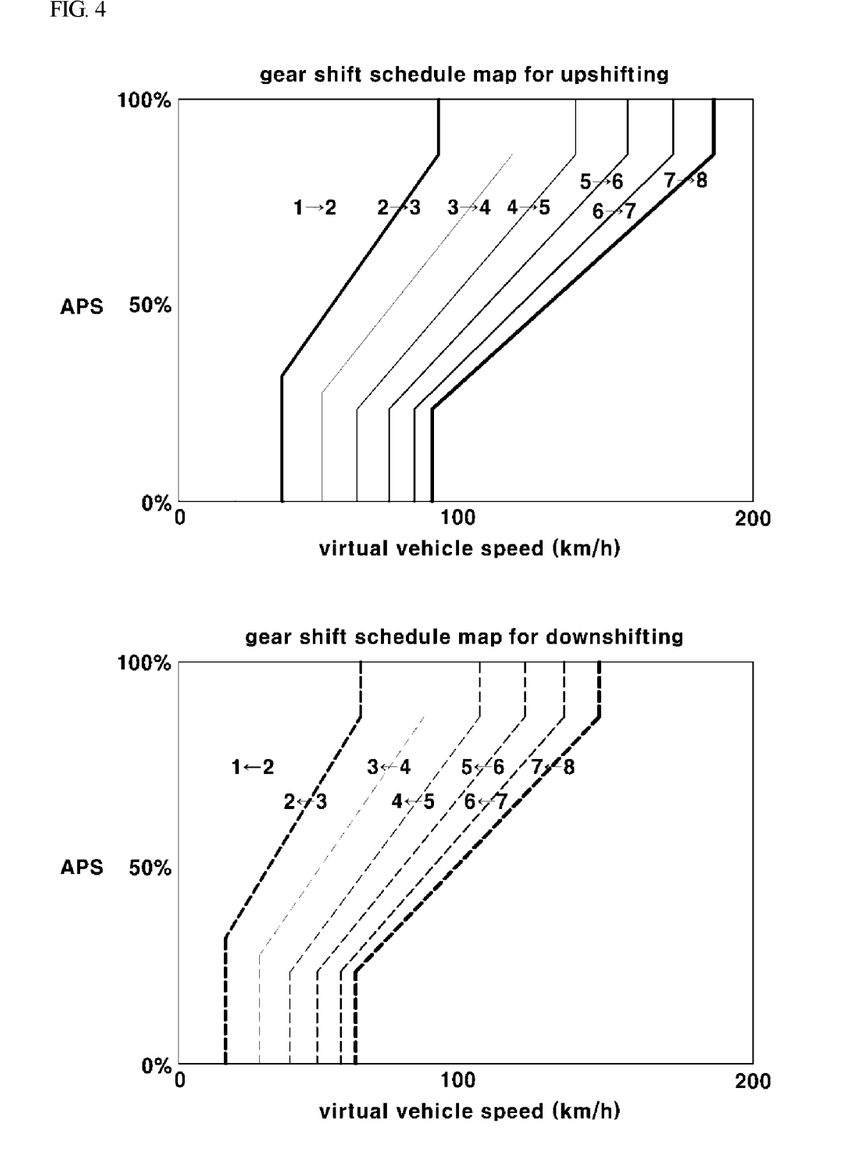
FIG. 4 is a view showing a gear shift schedule map for determining a virtual target gear shift stage in the present disclosure.

FIG. 4 is a view showing a gear shift schedule map for determining a virtual target gear shift stage TarGe in the present disclosure, and illustrating the gear shift schedule map for upshifting and the gear shift schedule map for downshifting, which are provided respectively. In each gear shift schedule map shown, the horizontal axis represents the vehicle speed (km/h), and the vertical axis represents the accelerator pedal input value (APS value), and at this time, the vehicle speed of the horizontal axis is the virtual vehicle speed SpdVir that is the reference vehicle speed.

As described above, the gear shift schedule map uses a virtual vehicle speed SpdVir and an accelerator pedal input value (APS value) indicating the driver's intent, and the virtual target gear shift stage TarGe corresponding to the virtual vehicle speed SpdVir and the accelerator pedal input value (APS value) may be determined from the gear shift schedule map. As shown in FIG. 4, when the gear shift schedule map for upshifting and the gear shift schedule map for downshifting are separately provided, a virtual vehicle speed may be used as a vehicle speed for determining a virtual target gear shift stage TarGe, and at this time, the virtual vehicle speed is the virtual vehicle speed SpdVir that is the reference speed obtained from the actual motor speed Omega and the virtual final gear ratio rFg, as described above.

As described above, when the gear shift schedule maps for upshifting and downshifting are separately used, the virtual target gear shift stage TarGe may be determined from the virtual vehicle speed SpdVir that is the reference vehicle speed and the accelerator pedal input value (APS value). However, when a single gear shift schedule map is used for upshifting and downshifting, a virtual target gear shift stage TarGe may be determined using a virtual vehicle speed SpdVir for downshifting separately from the virtual vehicle speed SpdVir that is the reference vehicle speed.

Figure 5:
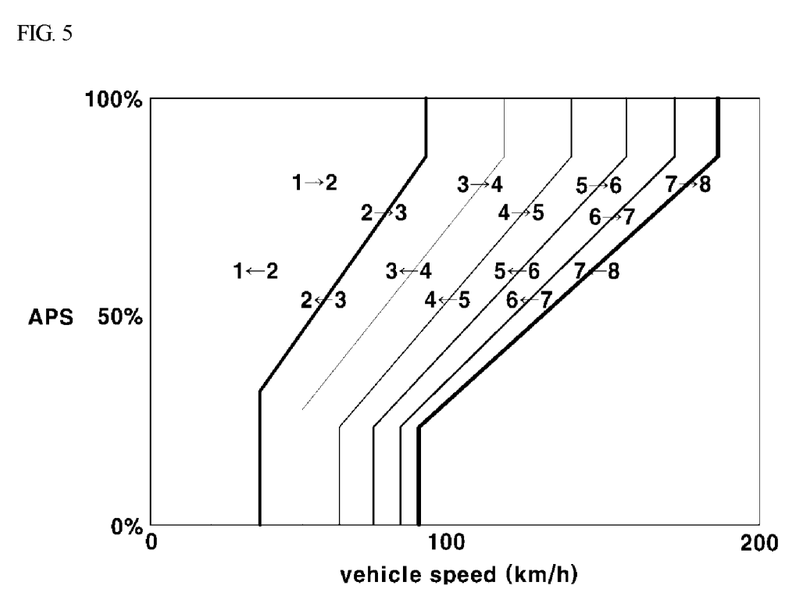
FIG. 5 is a view showing the gear shift schedule map that may be used for both upshifting and downshifting in the present disclosure.

FIG. 5 is a view showing the gear shift schedule map that may be used for both upshifting and downshifting in the present disclosure. When the single gear shift schedule map shown in FIG. 5 is used for both upshifting and downshifting, during the upshifting, the virtual vehicle speed SpdVir that is the reference vehicle speed (becoming a virtual vehicle speed for upshifting) is used, and during the downshifting, the virtual vehicle speed for downshifting SpdVirDn may be used to determine the virtual target gear shift stage TarGe in the gear shift schedule map.

In other words, by using one gear shift schedule map, during upshifting, the virtual target gear shift stage TarGe may be determined from the virtual vehicle speed SpdVir that is the reference vehicle speed and the accelerator pedal input value (APS value), and during downshifting, the virtual target gear shift stage TarGe may be determined from the virtual vehicle speed for downshifting SpdVirDn and the accelerator pedal input value (APS value). In the gear shift schedule map of FIG. 5, when the vehicle is upshifted, the vehicle speed of the horizontal axis is the virtual vehicle speed SpdVir that is the reference speed, and when the vehicle is downshifted, the vehicle speed of the horizontal axis is the virtual vehicle speed SpdVirDn for downshifting.

In the above description, although the vertical axes of FIGS. 4 and 5 are described as the accelerator pedal input value, that is, the APS value (%), other vehicle load values may be the vertical axis values of the gear shift schedule map instead of the accelerator pedal input values. In other words, the vertical axis of the gear shift schedule map may be a brake pedal input value (BPS value) or a basic torque command instead of the accelerator pedal input value.

Along with this virtual vehicle speed, there may be an input variable of a gear shift schedule map for determining a virtual target gear shift stage. When the virtual vehicle speed SpdVir that is the reference vehicle speed is a virtual vehicle speed for upshifting, the virtual vehicle speed for downshifting SpdVirDn may be determined by a value added the offset value β after multiplying the virtual vehicle speed SpdVir for upshifting by a scale factor α, as shown in Equation 1 below.

$$SpdVir = SpdVirDn \times \alpha + \beta \quad (1)$$

Next, in the virtual gear shift model M of the virtual gear shift controller 22, whether to enter the manual gear shift mode may be determined, but when there is operation of the gear shift lever or input of the paddle shift, it may be determined that a manual gear shift mode that performs gear shifting according to the driver's intent is operated, whereas a general automatic gear shift in which gear shifting is automatically performed according to a preset gear shifting schedule is operated.

Since the target gear shift stage according to the driver's intent may be different from the target gear shift stage of when gear shifting automatically, in response to determining that the manual gear shift mode is operated, the target gear shift stage in the manual gear shift mode, that is, the virtual manual gear shift mode target gear shift stage TarGeMan may be determined in the virtual gear shift model M of the virtual gear shift controller 22.

The virtual manual gear shift mode target gear shift stage TarGeMan may be determined by the driver's gear shift lever input information or paddle shift input information. In addition, the final target gear shift stage in the virtual gear shift function may be calculated from the virtual gear shift model M of the virtual gear shift controller 22. As described above, fundamentally, in the automatic gear shift mode, the target gear shift stage determined by the gear shift schedule map may be determined as a virtual target shift stage TarGe, but in the manual gear shift mode, the virtual manual gear shift mode target gear shift stage TarGeMan determined by the driver's gear shift lever input or paddle shift input may be determined as the virtual target gear shift stage TarGe.

Explaining how to determine the target gear shift stage by the gear shift schedule map in the automatic gear shift mode (i.e., when not in the manual gear shift mode), as described above, the gear shift schedule map is used, which has input of load values such as virtual vehicle speed (km/h), accelerator pedal input value (APS value), etc. In particular, the gear shift schedule map is a map in which virtual target gear shift stages are set in advance, the virtual target gear shift stages corresponding to each combination as an input of vehicle load value information including virtual vehicle speed, accelerator pedal input values, etc., and as for the vehicle load value information, a brake pedal input value (BPS value) or a basic torque command, etc. may be used in addition to the accelerator pedal input value (APS value) that is the driving input information of a driver.

As for the reference speed used as the input of the gear shift schedule map, as described above, the virtual vehicle speed SpdVir determined by the virtual final gear ratio rFg and the actual motor speed Omega may be used, or a virtual vehicle speed for downshifting SpdVirDn determined from the virtual vehicle speed may be used. When determining the target gear shift stage as described above, at a current time point, there are two target gear shift stages, that is, the two target gear shift stages respectively determined by the virtual vehicle speed SpdVir that is the reference speed and the virtual vehicle speed for downshifting SpdVirDn.

At this time, the final target gear shift stage may be determined using two values, wherein, as a method thereof, a valid value may be determined only when the value of the target gear shift stage determined by the virtual vehicle speed SpdVir has increased from the value in the previous step (e.g., from the first gear shift stage to the second gear shift stage), so that the target gear shift stage determined by the virtual vehicle speed SpdVir may be determined and updated as the final virtual target gear shift stage TarGe.

In the same manner, a valid value may be determined only when the value of the target gear shift stage determined by the virtual vehicle speed for downshifting SpdVirDn has decreased from the value in the previous step (e.g., from the second gear shift stage to the first gear shift stage), so that the target gear shift stage determined by the virtual vehicle speed for downshifting SpdVirDn may be determined and updated as the final virtual target gear shift stage TarGe. However, the final determined virtual target gear shift stage TarGe should be calculated as a value within a range of selectable lowest and highest gear shift stages.

Meanwhile, in the virtual gear shift model of the virtual gear shift controller 22, a delayed target gear shift stage having a delayed value by a predetermined delay time may be determined from the virtual target gear shift stage TarGe, wherein the delay time uses a preset time, indicating the time in which gear shifting will be operated changing to the target gear shift stage, but the gear shift of the virtual engine speed OmegaVir has not yet started. This is the time referring to a state before starting of the inertia phase on the actual transmission.

In addition, the virtual gear shift model M of the virtual gear shift controller 22 may be configured detect a change in the target gear shift stage TarGe to calculate the virtual gear shift progress rate xProgress. Particularly, the change of the target gear shift stage indicates that a new virtual target gear shift stage different from the current gear shift stage is determined from the gear shift schedule map or paddle shift input or shift lever input information in the manual gear shift mode.

Counting starts at time 0 at a time when the target gear shift stage is changed (e.g., a time when the new virtual target gear shift stage is determined), and the gear shift progress rate xProgress may be determined as a percentage of the counted time with respect to the total preset gear shift time, wherein this gear shift progress rate xProgress rises up to 100 The time point at which the target gear shift stage is changed refers to time point at which the new virtual target gear shift stage is determined by the gear shift schedule map in the virtual current gear shift stage that is the previous target gear shift stage.

As described above, the counting may be started by setting a time point at which the target gear shift stage is changed to time 0, but it may be possible to alternatively apply the count start time to be a changed time point of the delayed target gear shift stage. In other words, when the changed virtual target gear shift stage is determined, the controller may be configured to count time from the time when the delay time has elapsed after the virtual target gear shift stage is determined, and determines the virtual gear shift progress rate in the same manner using the counted time.

Alternatively, as another method, during the gear shifting process, a value of the current virtual engine speed may be expressed as a percentage indicating where the value thereof obtained in real time is positioned between a target input speed based on virtual current gear shift stage (i.e., virtual engine speed of the virtual current gear shift stage) OmegaCur and a target input speed based on virtual target gear shift stage (i.e., virtual engine speed of the virtual target gear shift stage) OmegaTar. In other words, at the time when the virtual target gear shift stage is determined, the virtual gear shift progress rate may be determined as a percentage value of the speed difference between the virtual engine speed OmegaVir in real time and the target input speed based on virtual current gear shift stage OmegaCur during the gear shift process, with respect to the speed difference between the target input speed based on virtual target gear shift stage OmegaTar and the target input speed based on virtual current gear shift stage OmegaCur during the gear shifting process.

In addition, in the virtual gear shift model M of the virtual gear shift controller 22, the virtual engine speed OmegaCur may be determined using information of the virtual vehicle speed SpdVir that is fundamentally the reference speed and the virtual gear ratio rGi of the virtual current gear shift stage. In other words, the virtual engine speed OmegaCur may be obtained from the product of the virtual vehicle speed SpdVir and the virtual gear ratio rGi of the virtual current gear shift stage, or the virtual engine speed OmegaCur may be obtained from the product of the powertrain speed such as the motor speed and the virtual gear ratio rGi of the virtual current gear shift stage.

In addition, during the gear shifting process from the time when the target gear shift stage changes, that is, when gear shifting starts, the virtual engine speed OmegaVir may be determined based on information of a target input speed based on virtual current gear shift stage (i.e., the virtual engine speed of the virtual current gear shift stage) OmegaCur and a target input speed based on virtual target gear shift stage (i.e., the virtual engine speed of the virtual target gear shift stage) OmegaTar.

Particularly, the target input speed based on virtual current gear shift stage OmegaCur may be obtained using the virtual vehicle speed SpdVir and the virtual gear ratio rGi of the virtual current gear shift stage CurGe at the time when the target gear shift stage is changed. In addition, the target input speed based on virtual target gear shift stage OmegaTar may be obtained using the virtual vehicle speed SpdVir and the virtual gear ratio rGi of the virtual target gear shift stage TarGe when the target gear shift stage is changed.

Subsequently, in the process of gear shifting, the virtual engine speed OmegaVir may be obtained by applying a preset rate limit to the target input speed based on virtual current gear shift stage. In other words, in the present disclosure, the current virtual engine speed OmegaVir during the gear shifting process may be obtained from the virtual vehicle speed in real time, but may be determined as a value that changes while maintaining a preset rate limit (i.e., change rate limit value) from the virtual speed based on current gear shift stage (i.e., the target input speed based on the virtual current gear shift stage) up to the virtual speed based on the target gear shift stage (i.e., the target input speed based on virtual target gear shift stage).

In addition, as the gear shifting progresses to some extent, the virtual engine speed OmegaVir set to a target input speed based on virtual current gear shift stage (i.e., the virtual engine speed of the virtual current gear shift stage) OmegaCur may be replaced by a target input speed based on virtual target gear shift stage (i.e., the virtual engine speed of the virtual target gear shift stage) OmegaTar. As an alternative method, the virtual engine speed OmegaVir may be obtained by multiplying the virtual gear ratio rGi corresponding to the previously calculated delayed target gear shift stage by the virtual vehicle speed SpdVir that is the reference vehicle speed, and by taking its rate limit value.

Meanwhile, in the virtual gear shift model M of the virtual gear shift controller 22, the virtual current gear shift stage CurGe fundamentally refers to the current gear shift stage of the previous time step, that is, the current gear shift stage before the gear shift start, until the current gear shift completion condition is satisfied. In other words, the current gear shift stage value may be maintained until the gear shift completion condition is satisfied, and the virtual target gear shift stage determined by the gear shift schedule map may be maintained as the targeted gear shift stage after gear shifting from the state of before the gear shift is completed.

However, when the gear shift completion condition is satisfied after the start of gear shift, the virtual target gear shift stage TarGe before satisfaction may be updated to the virtual current gear shift stage CurGe, and the previous target gear shift stage becomes the current gear shift stage from a time point of satisfaction of the gear shift completion condition. At this time, the gear shift completion condition may include one or more of the following conditions.

1) The condition that the virtual gear shift progress rate xProgress value is 100%.

2) The condition that the virtual gear shift progress rate xProgress value is reset to 0%.

3) The condition that the virtual gear shift progress rate xProgress value is greater than a certain value.

4) The condition that the difference between the virtual engine speed OmegaVir and the virtual engine speed of the virtual target gear shift stage (i.e., the target input speed based on virtual target gear shift stage) OmegaTar is less than a certain value.

5) The condition where the value obtained by multiplying the virtual gear ratio rGi corresponding to the delayed target gear shift stage by the virtual vehicle speed SpdVir that is the reference vehicle speed is equal to the virtual engine speed OmegaVir obtained by taking a rate limit value to the multiplied value, or the difference between the two values is equal to a certain value, or is less than or equal to a certain value.

In particular, when describing "the condition that the virtual gear shift progress rate xProgress value is reset to 0%", in the case where a control logic is programmed to be reset to 0% immediately after the status based on a status that the virtual gear shift progress rate reaches 100%, that the time point when reset to 0% as described above may be determined to be the time point at which the gear shift is completed. In other words, the gear shift progress rate will remain at 0% until a gear shifting event starts again, but it may be possible to determine that the time point when the gear shift progress rate firstly reaches 0% is determined as the time when the gear shifting is completed.

As described above, the completion of gear shifting may be determined based on the virtual gear shift progress rate xProgress, but may also be determined based on the virtual engine speed. Even though the virtual engine speed converges so that the difference value is less than or equal to the virtual engine speed of the virtual target gear shift stage, the gear shift completion condition may be determined to be satisfied.

Next, in a vehicle having a real transmission, the torque multiplication effect between the front and rear of the transmission decreases due to the reduction in gear ratio as gear upshifting occurs, and eventually, even though the engine generates the same torque, the final acceleration is reduced. To mimic this effect, the present disclosure may calculate the limit torque for each virtual gear shift stage tqLmt and uses the limit torque to limit the torque command.

At this time, in the virtual gear shift model of the virtual gear shift controller 22, the limit torque for each virtual gear shift stage tqLmt (which is the limit torque of the current gear shift stage) may be calculated by multiplying all of the virtual gear ratio rGi corresponding to the virtual current gear shift stage CurGe, the virtual final gear ratio rFg, and the limit torque setting parameters. In addition, the limit torque for each virtual gear shift stage tqLmt may be dualized and set in the driving direction and the regenerative direction of the motor, which may be implemented by dualization of the limit torque setting parameter.

To adjust motor torque by applying such limit torque, the motor torque in the driving direction may be limited to a limit torque tqLmt value for the driving direction, and the motor torque in the regenerative direction may be limited to a limit torque tqLmt value for the regenerative direction. In yet another method, after calculating the basic torque command by way of generating and adding three types of motor torque commands: regenerating, coasting, and driving, the torque command may be limited to the limit torque tqLmt value for the driving direction when driving, and may be limited to the limit torque tqLmt value for the regenerative direction during coasting and regenerating where the vehicle is driven in a coast-down mode.

Undoubtedly, are generating torque command and the coast torque command may be 0 when driving, and the driving torque command may be 0 when regenerating or coasting. In addition, for the purpose of simulating gear ratio effect for each gear shift stage applied proportionally as well as limiting the maximum magnitude of torque, when determining the value between the accelerator pedal input value (APS value) and the driving torque, the ratio of applying the accelerator pedal input value to the limit torque tqLmt value for the current driving direction may be used, rather than the ratio of the accelerator pedal input value (APS value) to the maximum motor torque.

In addition to the method of determining the torque command by the ratio of the simple accelerator pedal input value (APS value) of the limit torque for each virtual gear shift stage tqLmt, it may also be possible to determine the torque command by a torque ratio which is a function of the preset accelerator pedal input value of the limit torque tqLmt. For example, it may be possible to determine the basic torque command as the torque of 20%, 50%, and 80% of the limit torque tqLmt when the accelerator pedal input values are 20%, 50%, and 80%, respectively, but when the APS value is 20%, 50%, and 80%, and the torque ratio value mapped to each APS value is 40%, 70%, and 85%, the basic torque command may be determined with torques of 40%, 70%, and 85% of the limit torque tqLmt, respectively.

Figure 6:
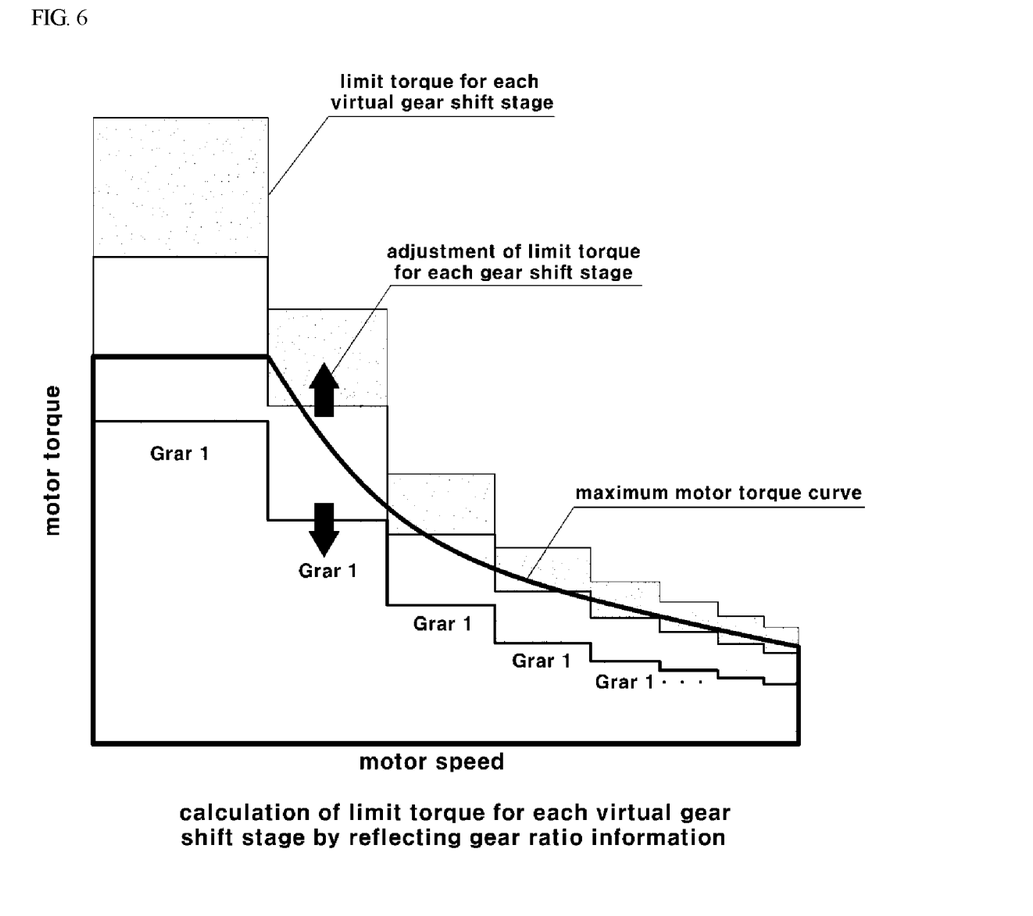
FIG. 6 is a view showing a maximum motor torque curve and limit torque for each virtual gear shift stage according to motor speed in the present disclosure.

FIG. 6 is a view showing a maximum motor torque curve according to the motor speed and limit torque for each virtual gear shift stage (Gear 1, 2, 3, 4, 5, . . . ) in the present disclosure. Referring to FIG. 6, it may be seen that the greater the speed of the motor, the greater the number of gear shift stages (i.e., the number of gears), and the greater the number of gear shift stages, that is, the higher the gear shift stage, the smaller the maximum motor torque.

In addition, as the number of gear shift stages increases, the gear ratio decreases, and the final wheel transmission torque decreases compared to the low gear shift stage at the high gear shift stage. The maximum motor torque curve is a curve that represents a maximum allowable torque preset for each motor speed, and limit torque for each virtual gear shift stage may be calculated by applying the gear ratio information for each gear shift stage.

FIG. 6 shows various examples in which the limit torque for each virtual gear shift stage is determined, and as described above, the limit torque for each virtual gear shift stage (i.e., limit torque of current gear shift stage) may be calculated by multiplying all of the virtual gear ratio rGi corresponding to the virtual gear shift stage CurGe, the virtual final gear ratio rFg, and the limit torque setting parameters. This indicates that magnitude of the limit torque for each virtual gear shift stage may be set according to the value of the limit torque setting parameter, and, referring to FIG. 6, it is shown that the limit torque for each virtual gear shift stage may be adjusted to a value above or below the maximum motor torque curve.

As an example, the limit torque for each virtual gear shift stage may be set to a larger value than the maximum motor torque curve to include all thereof, as shown in FIG. 6, and in this case, it becomes possible to use maximum performance of the motor. Alternatively, a curved line of the limit torque for each virtual gear shift stage may be set to be in a form crossing the maximum motor torque curve, wherein, in some areas of the motor speed for each virtual gear shift stage, the limit torque of the gear shift stage is set higher than the value of the maximum motor torque curve, and in the remaining areas, the limit torque may be set less than or equal to the value of the maximum motor torque curve.

Accordingly, it may be possible to use the maximum performance of the motor in some areas of the motor speed for each virtual gear shift stage, and it may also be possible to realize the effect of the gear ratio difference between gear shift stages in some areas. In addition, it may be possible to set the limit torque for each virtual gear shift stage to all values less than the maximum motor torque curve in the entire range of the motor speed, and in this case, it is impossible to use the maximum performance of the motor, but it becomes possible to realize the effect of the gear ratio difference between stages to the maximum.

Meanwhile, the final torque command generator 23 of the first controller 20 may be configured to receive the summed basic torque command from the torque command generator 21, and receive the virtual gear shift intervention torque command from the virtual gear shift controller 22 In addition, the final torque command generator 23 may be configured to correct the basic torque command generated by the torque command generator 21 using the virtual gear shift intervention torque command generated by the virtual gear shift controller 22, and at this time, in addition to the summed basic torque command, a virtual torque intervention torque command, which is a correction torque command for generating a virtual sensation of gear shifting, may be further added to generate a final torque command.

Figure 7:
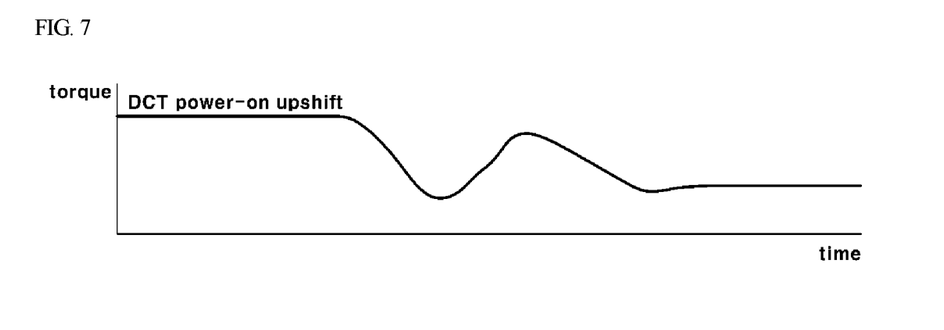
FIG. 7 is a view showing an example of a virtual gear shift intervention torque profile in the present disclosure.

FIG. 7 is a view showing an example of a virtual gear shift intervention torque profile in the present disclosure. Accordingly, the second controller 30 may be configured to receive the final torque command generated and output by the final torque command generator 23 of the first controller 20 and then operate the inverter to control the driving motor 41 according to the received final torque command.

As a result, it may be possible to realize a vehicle jerk phenomenon that occurs according to a gear shift effect during virtual gear shifting, similar to the gear shift effect of a real transmission when gear shifting. In the virtual gear shift model of the virtual gear shift controller 22, the virtual gear shift intervention torque tqItv may be provided in the form of a torque profile with the virtual gear shift progress rate xProgress as an independent variable.

Alternatively, the virtual gear shift intervention torque tqItv may be provided by a physical value reflected model based on information of virtual engine speed OmegaVir, target input speed based on virtual current gear shift stage (i.e., the virtual engine speed of the virtual current gear shift stage) OmegaCur, and target input speed based on virtual target gear shift stage (i.e., the virtual engine speed of the virtual target gear shift stage) OmegaTar. In addition, in calculating the virtual gear shift intervention torque command, the form of the virtual gear shift intervention torque should be changed according to a type of transmission and a gear shift class, and the type of transmission may be divided into an automatic transmission (AT), a dual clutch transmission (DCT), and an automated manual transmission (AMT).

In addition, the gear shift class may be divided into power-on upshift, power-off upshift (lift-foot-up), power-on downshift (kick-down), power-off downshift, near-stop downshift, etc. To calculate the virtual gear shift intervention torque command, the current gear shift class may be determined by the virtual gear shift controller 22. In the determination method, when the virtual target gear shift stage TarGe is higher than the virtual current gear shift stage CurGe (i.e., the virtual target gear shift stage>virtual current gear shift stage), the current gear shift class is upshift, whereas when the virtual target gear shift stage is less than the virtual current gear shift (i.e., the virtual target gear shift stage<virtual current gear shift stage), the current gear shift class is downshift.

In addition, when the basic torque command is greater than a preset reference torque value, power-on is in operation, whereas when the basic torque command is less than a preset reference torque value, power-off is in operation. Eventually, in the present disclosure, when the current gear shift class is determined based on the virtual current gear shift stage and the virtual target gear shift stage, etc., among the virtual gear shift intervention torque profiles for each gear shift class, a virtual gear shift intervention torque profile that corresponds to the current gear shift class may be selected, and the virtual gear shift intervention torque for generating the virtual sensation of gear shifting may be determined in real time according to the selected virtual gear shift intervention torque profile.

At this time, a virtual gear shift intervention torque value that corresponds to the current virtual gear shift progress rate may be determined from the selected virtual gear shift intervention torque profile. The virtual gear shift intervention torque profile is information set in advance for each gear shift class in the virtual gear shift model M of the virtual gear shift controller 22. In addition to the gear shift class, a differentiated virtual gear shift intervention torque profile may be set in advance according to the type of the gear shift.

The magnitude of the virtual gear shift intervention torque may be adjusted using, as a torque magnitude setting variable, the virtual engine speed OmegaVir, the accelerator pedal input value (APS value), the actual motor torque (i.e., the motor basic torque command generated by the torque command generator), and at least one or more of a combination of one or both of the virtual current gear shift stage CurGe and the virtual target gear shift stage TarGe. Generally, as the magnitude of the motor torque (i.e., the basic torque command) increases, the magnitude of the virtual gear shift intervention torque is increased; as the gear shift stage becomes higher, the magnitude of the virtual gear shift intervention torque is decreased due to the gear ratio between the gear shift stages; and as the virtual engine speed increases, the decrease and increase extent of speed increases when gear shifting, whereby it is natural to increase the magnitude of the virtual gear shift intervention torque.

Next, even though the actual motor speed Omega is low, the virtual engine speed OmegaVir may be high. At this time, to simulate the behavior of a vehicle equipped with a transmission, the virtual red zone may be determined when the virtual engine speed OmegaVir is greater than or equal to a preset threshold speed value. In particular, the threshold speed refers to the maximum allowable rotational speed (rpm) of the engine, which is predetermined in a conventional internal combustion engine vehicle, and may be determined to have entered the red zone when the virtual engine speed exceeds the threshold speed (See step S15 of FIG. 3).

In the automatic gear shift mode, it may be possible to preset the gear shift schedule to perform gear upshifting before entering the red zone, so that it is not necessary to determine the virtual red zone, but when entering the manual gear shift mode, the virtual gear shift stage may be maintained until entering the driver's intent, whereby it may be possible to enter the virtual red zone. In response to determining that the virtual red zone is entered, an engine fuel-cut situation may be simulated by performing virtual fuel-cut control, and the simulation may be implemented by generating a motor torque command that targets the threshold speed at which the virtual red zone starts to operate the motor (See step S15 of FIG. 3).

For example, proportional torque reduction control or PID torque control using the error between the current virtual engine speed OmegaVir and the threshold speed may be performed. In another method, when the threshold speed is exceeded, the torque command may be set to a predetermined value to decelerate the vehicle, and when the speed is decreased to below the threshold speed, the torque corresponding to the driver's intent may be restored. In addition, in response to determining that the virtual red zone has been entered to simulate the fuel-cut situation, deliberate torque ripple may be additionally added to the basic torque command.

At this time, the torque ripple at the time of fuel-cut having a predetermined magnitude and period may be added to the basic torque command, thereby enabling vibration in a virtual fuel-cut situation. In addition, in all cases, when the basic torque command according to the driver's intent is less than the torque command that sets a threshold speed at which the virtual red zone starts as a control target of the virtual engine speed, the red zone control torque is ignored and only the basic torque command according to the driver's intent is applied.

Figure 8:
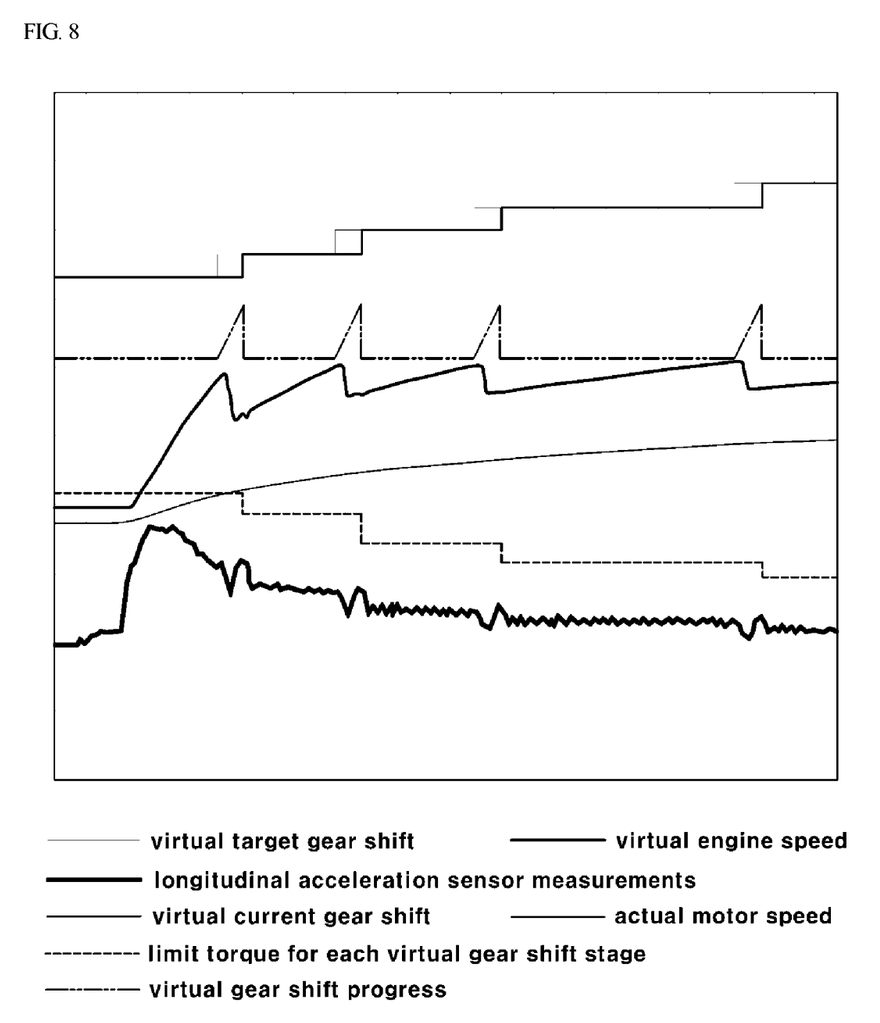
FIG. 8 is a view showing a gear shift state and a vehicle behavior state in a virtual gear shift process according to the present disclosure.

Accordingly, the control method for generating the virtual sensation of gear shifting of the electric vehicle according to the present disclosure has been described. FIG. 8 is a view showing a gear shift state and a vehicle behavior state in the virtual gear shift process according to the present disclosure. Referring to FIG. 8, when the virtual vehicle speed is obtained from the actual motor speed Omega detected by the motor speed detector, the virtual target gear shift stage may be determined from the accelerator pedal input information and the virtual vehicle speed, and the gear shift simulating the virtual target gear shift stage may be performed. In addition, it may be possible to check the acceleration state representing the vehicle behavior as the same in real gear shifting at every other time of each virtual gear shifting.

Although the exemplary embodiments of the present disclosure have been described in detail above, the scope of the present disclosure is not limited thereto, and various modifications and improvements of those skilled in the art using the basic concepts of the present disclosure as defined in the following claims are also included in the scope of the present disclosure.

What is claimed is:

1. A control method of generating a virtual sensation of gear shifting of an electric vehicle, comprising:
   determining, by a controller, a basic torque command in real time based on vehicle driving information collected while the electric vehicle is being driven;
   determining, by the controller, a virtual target gear shift stage based on the vehicle driving information collected from the vehicle;
   determining, by the controller, a gear shift class from a virtual current gear shift stage and the determined virtual target gear shift stage and selecting a virtual gear shift intervention torque profile corresponding to the determined current gear shift class from among preset virtual gear shift intervention torque profiles for each gear shift class;
   determining, by the controller, a virtual gear shift intervention torque for generating the virtual sensation of gear shifting in the real time according to the selected virtual gear shift intervention torque profile and generating a final motor torque command using the e determined basic torque command and the virtual gear shift intervention torque; and
   adjusting, by the controller, an operation of a motor for driving the vehicle according to the generated final motor torque command;
   wherein, in the determining of the basic torque command in real time, the basic torque command is calculated from a sum of a regenerating torque command, a coasting torque command, and a driving torque command; and
   wherein, in the generating of the final motor torque command, when driving, the summed basic torque command is limited to a limit torque value for the driving direction, and
   when coasting and regenerating, the summed basic torque command is limited to a limit torque value for the regenerative direction.

2. The control method of claim 1, wherein, in the determining of the virtual target gear shift stage, a virtual vehicle speed that is a reference speed is determined based on the vehicle driving information, and the virtual target gear shift stage is determined from the determined virtual vehicle speed and vehicle load value by a preset gear shift schedule map.

3. The control method of claim 2, wherein the vehicle load value is one of an accelerator pedal input value or a brake pedal input value by the driver, or the basic torque command.

4. The control method of claim 2, wherein the virtual vehicle speed is determined from an actual motor speed detected by a motor speed detector and a preset virtual final gear ratio.

5. The control method of claim 2, wherein:
   the virtual vehicle speed that is the reference speed is a virtual vehicle speed for upshifting, the virtual target gear shift stage is determined by the gear shift schedule map using the virtual vehicle speed for upshifting during upshifting, and
   the virtual target gear shift stage is determined by the gear shift schedule map using a virtual vehicle speed for downshifting calculated by applying a scale factor and an offset value to the virtual vehicle speed for upshifting during downshifting.

6. The control method of claim 5, wherein the virtual vehicle speed for downshifting is determined as a value obtained by multiplying the virtual vehicle speed for upshifting by the scale factor greater than 1 and adding a positive offset value to the multiplied value.

7. The control method of claim 1, wherein:
   in the determining of the virtual target gear shift stage, the vehicle driving information used to determine the virtual target gear shift stage includes paddle shift input information by the driver and gear shift lever input information by a driver, and
   the controller is configured to determine a manual gear shift mode in response to receiving a paddle shift input or a shift lever input by the driver, to determine the virtual target gear shift stage according to the paddle shift input information or the shift lever input information.

8. The control method of claim 1, further comprising:
   calculating, by the controller, a limit torque of the current gear shift stage by a value multiplied all of a virtual gear ratio corresponding to the virtual current gear shift stage, a preset virtual final gear ratio, and a limit torque setting parameter,
   wherein, in the generating of the final motor torque command, the basic torque command of a value limited by the limit torque is used to generate the final motor torque command, when the basic torque command is greater than or equal to the calculated limit torque value.

9. The control method of claim 8, wherein the limit torque includes a limit torque for a driving direction for limiting the basic torque command in the driving direction and a limit torque for a regenerative direction for limiting the basic torque command in the regenerative direction, and in the generating of the final motor torque command, the basic torque command limited by one of the limit torque for the driving direction and the limit torque for the regenerative direction is used.

10. The control method of claim 1, further comprising:
    counting, by the controller, time from a time point when the virtual target gear shift stage is determined and determining a virtual gear shift progress rate using the counted time during a gear shifting process when the virtual target gear shift stage is determined,
    wherein the virtual gear shift progress rate is determined as a percentage value of the counted time with respect to the set total gear shift time, and
    wherein in the generating of the final motor torque command, the controller is configured to determine a virtual gear shift intervention torque value corresponding to the current virtual gear shift progress rate from the virtual gear shift intervention torque profile.

11. The control method of claim 1, further comprising:
    counting, by the controller, time from a time point when set delay time has elapsed after the virtual target gear shift stage is determined; and
    determining, by the controller, a virtual gear shift progress rate using the counted time during a gear shift process when the virtual target shift stage is determined,
    wherein the virtual gear shift progress rate is determined as a percentage value of the counted time with respect to the set total gear shift time, and
    wherein in the generating of the final motor torque command, the controller is configured to determine a virtual gear shift intervention torque value corresponding to the current virtual gear shift progress rate from the virtual gear shift intervention torque profile.

12. The control method of claim 1, further comprising:
determining, by the controller, a virtual vehicle speed from an actual motor speed detected by a motor speed detector and a preset virtual final gear ratio;
determining, by the controller, a virtual engine speed of the virtual current gear shift stage using the virtual vehicle speed at a time point when the virtual target gear shift stage is determined and virtual gear ratio information of the virtual current gear shift stage;
determining, by the controller, the virtual engine speed of the virtual target gear shift stage using the virtual vehicle speed at the time point when the virtual target gear shift stage is determined and the virtual gear ratio information of the virtual target gear shift stage; and
determining, by the controller, a virtual gear shift progress rate from the determined virtual engine speed of the determined virtual current gear shift stage, the virtual engine speed of the virtual target gear shift stage, and the current virtual engine speed obtained during a gear shift process after the virtual target gear shift stage is determined,
wherein, in the generating of the final motor torque command, the controller is configured to determine a virtual gear shift intervention torque value corresponding to the current virtual gear shift progress rate from the virtual gear shift intervention torque profile.

13. The control method of claim 12, wherein, in the determining the virtual gear shift progress rate, the virtual gear shift progress rate is determined by a percentage value of a speed difference between the current virtual engine speed and the virtual engine speed of the virtual current gear shift stage with respect to a speed difference between the virtual engine speed of the virtual target gear shift stage and the virtual engine speed of the virtual current gear shift stage.

14. The control method of claim 1, further comprising:
determining, by the controller, a virtual vehicle speed from the actual motor speed detected by a motor speed detector and a preset virtual final gear ratio at a time point in response to determining the virtual target gear shift stage;
determining, by the controller, a virtual engine speed of the virtual current gear shift stage using the determined virtual vehicle speed and virtual gear ratio information of the virtual current gear shift stage at the time point in response to determining the virtual target gear shift stage;
determining, by the controller, a virtual engine speed of the virtual target gear shift stage using the determined virtual vehicle speed and the virtual gear ratio information of the virtual target gear shift stage at the time point in response to determining the virtual target gear shift stage; and
determining, by the controller, a virtual engine speed with a value which a determined rate limit is applied to the determined virtual engine speed of the virtual current shift stage during a gear shift process at the time point in response to determining the virtual target gear shift stage.

15. The control method of claim 1, further comprising:
determining, by the controller, a virtual vehicle speed from the actual motor speed detected by a motor speed detector and a preset virtual final gear ratio;
determining, by the controller, a virtual engine speed using the determined virtual vehicle speed and virtual gear ratio information of the virtual current gear shift stage; and
controlling, by the controller, to display the determined virtual engine speed on a cluster.

16. The control method of claim 1, further comprising:
displaying, by the controller, the virtual current gear shift stage and the determined virtual target gear shift stage on a cluster.

17. The control method of claim 1, further comprising:
determining, by the controller, a virtual vehicle speed from the actual motor speed detected by a motor speed detector and a preset virtual final gear ratio;
determining, by the controller, a virtual engine speed using the determined virtual vehicle speed and virtual gear ratio information of the virtual current gear shift stage;
comparing, by the controller, the virtual engine speed with a set threshold speed, determined, and determining that the virtual engine speed has entered a virtual red zone in response to determining that the virtual engine speed is greater than or equal to the threshold speed; and
generating, by the controller, a torque command for reducing the virtual engine speed by targeting the threshold speed and performing virtual fuel-cut control for adjusting a motor operation in response to determining an entry of the virtual red zone.

18. The control method of claim 17, wherein, during the virtual fuel-cut control, the controller is configured to adjust the motor operation using a torque command summing torque ripple during fuel-cut having magnitude and a period set in the torque command for reducing the virtual engine speed.

19. The control method of claim 1, wherein the controller is configured to perform each of above steps in response to receiving an on operation signal of a virtual gear shift function from a driver viaan interface part in the vehicle or a mobile device.

* * * * *